United States Patent [19]
Otey et al.

[11] 3,949,145
[45] Apr. 6, 1976

[54] DEGRADABLE STARCH-BASED AGRICULTURAL MULCH FILM

[75] Inventors: Felix H. Otey; Arthur M. Mark, both of Peoria, Ill.

[73] Assignee: The United States of America as represented by the Secretary of Agriculture, Washington, D.C.

[22] Filed: Feb. 27, 1975

[21] Appl. No.: 554,058

[52] U.S. Cl. .................. 428/423; 47/9; 47/37; 260/17.4 ST; 260/859 R; 260/DIG. 43; 427/402; 427/407; 428/500; 428/532; 264/216
[51] Int. Cl.² .......................................... A01G 7/00
[58] Field of Search ............ 47/9, 37; 428/423, 500, 428/532; 427/402, 407; 260/DIG. 43, 850, 17.4 ST

[56] References Cited
UNITED STATES PATENTS

| | | | |
|---|---|---|---|
| 3,316,190 | 4/1967 | Suzumura et al. | 260/17.4 ST |
| 3,444,266 | 5/1969 | Reischl et al. | 260/859 PV |
| 3,767,604 | 10/1973 | Hjermstad et al. | 260/17.4 ST |

Primary Examiner—William J. Van Balen
Assistant Examiner—R. J. Roche
Attorney, Agent, or Firm—M. Howard Silverstein; Max D. Hensley; David G. McConnell

[57] ABSTRACT

Disclosed herein are plastic film compositions for agricultural mulch which will withstand outdoor weathering conditions for a desired time and then rapidly disintegrate. The film composition comprises starch, poly(vinyl alcohol), glycerol, and a water-resistant coating.

24 Claims, No Drawings

DEGRADABLE STARCH-BASED AGRICULTURAL MULCH FILM

BACKGROUND OF THE INVENTION

This invention relates to degradable agricultural mulch films. More particularly, this invention relates to mulch films that are stable to weathering conditions for a predetermined period and then rapidly decompose.

Applying plastic film for agricultural mulching has increased rapidly the past few years. Vegetables, tomatoes, and strawberries are among the more common crops on which plastic mulch is used. Principal benefits of mulching are to provide weed control, warm the soil for early crop production, control soil moisture, and reduce nutrient leaching.

Polyethylene film is the most common plastic mulch; however, it must be removed from the field and burned or buried at the end of each fruiting season since it does not decompose in time to start the subsequent crop. In fact, the plastic persists for several years if not removed.

Because the removal and burying or burning of plastic mulch is both costly and has an adverse effect on the ecology, the need for a plastic mulch that will decompose at the end of a growing season has recently become apparent. The preferred mulch life of a film depends upon the individual crop. For tomatoes we estimate that the film should remain intact for 3 to 4 mo.; for lettuce, radishes, and other quick maturing crops with a one-time harvest, the film needs to last only a few weeks. In many areas where these crops are grown the climatic conditions are suitable for growing two or more crops per year on the same plot. Here it would be particularly advantageous to use plastic mulch that will rapidly deteriorate after a given time of use and not interfere with soil preparation and planting of the new crop.

Numerous attempts have been made to produce a suitable degradable mulch [Chem. Wk. 110: 44 (1970)] including polyethylene-coated paper [HortScience 7: 568 (1972)] and polybutene-1 films (U.S. Pat. No. 3,590,528). None has been completely successful, apparently because they are too costly or they decompose too slowly for many applications.

We have developed a coated starch-based film that has strength and flexibility properties suitable for mulch applications but will degrade after a given time of weathering conditions—depending upon the amount of coating.

Although whole starch has been investigated for many years as a potential raw material for nonsupported films, it has never been successful because its films are brittle and are greatly affected by moisture [Cereal Chem. 40: 154 (1963)]. Large amounts of compatible plasticizers, such as glycerol or ethylene glycol, are effective softening agents for whole starch, but the films resulting are too soft and tacky at high humidity and have virtually no wet strength. These problems were overcome in this invention by preparing a starch-poly(vinyl alcohol) (st-PVA) film and coating the film with a water-resistant coating. Starch has been used with poly(vinyl alcohol), particularly in adhesives, textile sizes, water-insoluble films, and water-soluble films (for example: U.S. Pat. Nos. 3,652,541; 3,652,542; 3,472,804; 3,425,972; and 3,316,190).

In accordance with the invention, we have discovered a self-supporting, degradable agricultural mulch film comprising from 1 to 4 parts of poly(vinyl alcohol) (PVA) having a degree of hydrolysis of from 85 to 100%, 8 parts of starch, and from 1 to 5 parts of glycerol; said film being completely coated with from 5 to 20% of a water-resistant coating composition comprising a mixture of from 0.1 to 0.2 parts of a suitable polyol-toluene-diisocyanate prepolymer and 1 part of poly(vinylidene chloride-acrylonitrile) copolymer or 1 part of poly(vinyl chloride) resin containing a plasticizing amount of a suitable plasticizer.

The st-PVA film is coated to yield a composite film that resists weathering conditions associated with its use as an agricultural mulch for a controlled period and then rapidly deteriorates into small particles which mix harmlessly with the soil. The time at which decomposition occurs depends upon the thickness or amount of coating.

The reason for the controlled degradability of the starch-based film is not fully understood. However, it is believed to be due in part to the development of small fractures in the coating, due to exposure to weathering conditions, which in turn allow moisture to come in contact with and leach out the glycerol plasticizer. Without plasticizers starch films become brittle and rapidly deteriorate upon exposure to erosive forces. Furthermore, starch is known to rapidly biodegrade when exposed to soil microorganisms as would happen when soil moisture is permitted to pass through the coating.

DETAILED DESCRIPTION OF THE INVENTION

Films, such as those made in accordance with the invention, are defined by the polymer industry (Encyclopedia of Polymer Science and Technology, John Wiley and Sons, Inc., 1967, Vol. 6, page 764) as "shaped plastics that are comparatively thin in relation to their breadth and width and have a maximum thickness of 0.010 in." Self-supporting films are those "capable of supporting their own weight."

Starch-PVA films of the invention are prepared from any unmodified starch including that from wheat, corn, potatoes, rice, and tapioca. PVA having a degree of hydrolysis of from 85 to 100% is suitable for use in accordance with the invention. However, a degree of hydrolysis from 98 to 100% is preferred. PVA having degrees of polymerization of from 1000 to 1700 structural units are commercially available and are, therefore, preferred.

Since starch-PVA films are biodegradable and are greatly affected by moisture, they must be completely covered with the water-resistant resin coating to avoid premature degradation and the coating must be bonded to the film to prevent delamination. A bonding agent was developed especially for the invention which comprises a prepolymer of a polyol and toluene diisocyanate (TDI).

Films are prepared by mixing in an aqueous slurry 1 to 4 parts, preferably 2 to 3 parts, of PVA, 1 to 5 parts, preferably 2 to 4 parts, of glycerol per 8 parts of starch. The suspension is heated, for example at 60° to 100° C., preferably at 95° to 100° C., until the suspension becomes a thick paste and is bubble free, preferably from 30 min. to 2 hr. The hot suspension is then cast as a film and dried in a suitable manner including forced air drying at elevated temperatures, preferably from 110° to 130° C. Any of the methods of casting and drying films known to those skilled in the art are suitable for the purpose of the invention. Glycerol can be replaced in the above mixture by any other suitable plasticizer such as mono-, di-, and triethylene glycol. In the preferred embodiments of the invention, other components are added to the starch-PVA-glycerol suspension. About 0.2 part of formaldehyde and 0.4 part of $NH_4Cl$ per 8 parts of starch improves the flexibility of the final product and about 0.1 part per 8 parts of starch of a compatible surfactant such as polyoxyethylene sorbitan monooleate helps to prevent bubbles from forming in the hot suspension. Glyoxal and acetaldehyde are suitable replacements for formaldehyde and any acidic salt is a suitable replacement for $NH_4Cl$ in the above suspension.

The polyol-toluene-diisocyanate prepolymer bonding agent is prepared by reacting a polyol such as castor oil or any compound useful for making polyurethanes, including ethoxylated or propoxylated polyhydroxy compounds (Encyclopedia of Polymer Science and Technology, supra, Vol. 2, pages 509–574) with toluene-diisocyanate preferably in toluene. The amounts of reactants should be such that the prepolymer bonding agent contains from 0.1 to 2 equivalents of excess —NCO groups. That is, after all of the —OH groups on the polyol have reacted with —NCO groups on the toluene-diisocyanate, from 0.1 to 2 equivalents in excess of the stoichiometric amount of unreacted —NCO should remain in the product.

The coating solution is prepared by dissolving a water-resistant resin and the polyol-diisocyanate bonding agent in a compatible organic solvent such as methyl ethyl ketone. The amount of bonding agent is not critical to the operability of the invention, but we found that from 0.1 to 0.2 parts of bonding agent per part of water-resistant resin was sufficient to prevent delamination of the coating. The total concentration of components in the coating solutions is dependent only on the desired amount of coating and on the method of application. In the dip method as described in the examples, it is convenient to keep the concentration of the component in the coating solution constant and repeatedly dip and dry the film until the desired amount of coating is obtained. For example, a single dipping of the starch-PVA film in a solution with a 5 to 13% concentration of components provided final products having coatings which were 5 to 10% by weight. Two dippings provided products having coatings which were 10 to 15% by weight. More dippings provide heavier coatings. The amount of coating can also be varied by varying the total concentration of components in the coating solution.

In the preferred embodiment of the invention, a catalyst, such as dibutyltin dilaurate, is added to the coating solution in amounts of 0.1 to 0.3 parts per part of bonding agent to catalyze the bonding reaction of the polyol-diisocyanate to the starch-PVA film substrate. Other components, which are normally added to resin coating formulation, such as antiblock, slip, and wetting agents, can be incorporated into the coating solution.

Any water-resistant resin which forms a coating sufficiently flexible to resist cracking during preparation, handling, and use of the agricultural mulch film and is soluble in organic solvents is suitable for use in the invention. The preferred water-resistant resins include poly(vinyl chloride) (PVC) plasticized with a suitable plasticizer and those resins which are known in the trade as saran which contain from about 80 to 95 weight percent poly(vinylidene chloride) copolymerized with other unsaturated compounds including acrylonitrile, methyl acrylate, methyl methacrylate, vinyl acetate, styrene, and vinyl chloride.

For a discussion on suitable plasticizers for PVC, see the Encyclopedia of Polymer Science and Technology, supra, Vol. 14, pages 396–400. Suitable plasticizers include tritolyl phosphate, dinonyl phthalate, dioctyl phthalate, and dioctyl sebacate.

Preferable plasticizer content is from 20 to 50 weight percent of plasticized PVC.

Coatings can be applied to the starch-PVA film in any suitable manner including roller coating, dip and doctor, knife coater, and spraying. Those skilled in the art will be aware of the various methods and will choose the method most suitable to their own needs.

The amount of coating is directly related to the life expectancy of the film under field conditions as illustrated in the examples, infra. Films containing 8% by weight plasticized PVC deteriorate after 60 hr. of Weather-Ometer exposure. When the coating weight is increased to 18% by weight, the films deteriorate in 120 hr. In a like manner films containing 5 to 8% by weight saran coating deteriorate in 40 to 80 hr., respectively. Once deterioration began, it occurred rapidly, and the films became brittle and crumbled into small particles. As a general average about 300 hr. in the Weather-Ometer are equivalent to 1 year's field exposure in the central portion of the Northern Temperate Zone (Atlas Weather-Ometer Bull., Atlas Electric Devices Company, Chicago, Illinois, 1960).

These evaluations demonstrate that the new coated starch-based films of the invention will withstand weathering conditions commonly associated with crop production and after a given period, depending on the amount of coating, will become brittle and rapidly deteriorate. The amount of coating needed depends upon the crop application. For example, tomatoes, with a mulch requirement of about 3 mo., would need a film with slightly more than 8% by weight of a coating containing plasticized PVC or about 8% of a coating containing saran.

The following examples further illustrate the invention but should not be construed as limiting the invention which is defined by the claims.

All parts and percents herein disclosed are "by weight" unless otherwise specified.

EXAMPLE 1

In a suitable reactor equipped with a stirrer and steam heat were mixed 8 parts (dry basis) of air-dried unmodified pearl corn starch, 3.7 parts of glycerol, 2.4 parts poly(vinyl alcohol) (PVA, 99–100% hydrolyzed), and 90 parts water containing 0.1 part of polyoxyethylene sorbitan monooleate (PSM), and 0.5 cc. of 40% formaldehyde solution (0.2 part). The suspension was stirred with full steam heat applied so that the temperature was above 90° C. as quickly as possible. The mixture became a thick paste in about 2 min. after the temperature reached 90° C. Heating and stirring were continued at 95°–98° C. for 110 min. Then about 0.4 part of $NH_4Cl$ was added to catalyze the formaldehyde reaction with starch and poly(vinyl alcohol). Heating was continued for another 10 min. and then the paste was cast with a doctor blade at 30-mil. wet-thickness onto a silicone-coated plate glass preheated to 80°–90° C. The product was then dried to a clear film in a forced air oven at 130° C. for 5 min. The film was immediately removed from the glass plate and equilibrated at 50% relative humidity.

Specimens of this film could be soaked for more than 16 hr. without dissolving; yet, the water-soaked films, upon drying, were very brittle and easily broken into small particles. Analysis showed that most of the added glycerol plasticizer was leached into the water during soaking which caused the films to become brittle.

A TDI-castor oil prepolymer bonding agent was prepared by heating at 70° C. with stirring for 40 min. a solution comprising 33.6 parts (0.1 equivalents of hydroxyls) of castor oil, 13.5 parts (0.15 equivalents of NCO) of toluene-diisocyanate, and 20 parts of toluene.

Next, a solution was prepared comprising 7.0 parts PVC, 4 parts dioctyl phthalate, and 150 cc. methyl ethyl ketone (MEK). To the latter solution were then added 1.5 parts of the above-prepared TDI-castor oil prepolymer bonding agent solution and 0.2 part dibutyltin dilaurate catalyst. The starch-based film prepared as described above was then passed through the coating solution and then between two steel rods spaced about 1/16 in. apart and finally allowed to air dry at room temperature.

Based on weight differences, before and after coating, 8% of the film weight was coating. Properties of the film are recorded in Table 1.

EXAMPLE 2

A film was prepared and dried as described in Example 1 in the following proportions: 8 parts starch, 1.7 parts PVA, 2.4 parts glycerol, 0.2 part formaldehyde, 0.1 part PSM, and 0.4 part $NH_4Cl$.

The above film was coated with the same coating solution and in the same manner as described in Example 1. By repeating the coating procedure a second time an 18% coating was obtained. Properties of the coated film are recorded in Table 1.

EXAMPLE 3

A film was prepared and dried as described in Example 1 in the following proportions: 8 parts starch, 2.4 parts PVA, 3.7 parts glycerol, 0.2 part formaldehyde, 0.1 part PSM, and 0.4 part $NH_4Cl$. The above film was coated with the following coating solution: 7.0 parts poly(vinylidene chloride-acrylonitrile) copolymer (PVCA), 1.5 parts TDI-castor oil prepolymer bonding agent solution (Example 1), 0.2 part dibutyltin dilaurate, and 150 cc. MEK; in the manner described in Example 1. Properties of the coated film are recorded in Table 1.

EXAMPLE 4

Example 3 was repeated with the exception that the film was coated twice with the PVCA solution. Properties of the coated film are reported in Table 1.

EXAMPLE 5

A film was prepared and dried as described in Example 1 in the following proportions: 8 parts starch, 2 parts PVA, 3 parts glycerol, 0.2 part formaldehyde, 0.1 part PSM, and 0.4 part $NH_4Cl$. The above film was coated with the following coating solution: 9 parts PVC, 6 parts DOP, 150 cc. MEK, 2 parts TDI-castor oil prepolymer bonding solution described in Example 1, and 0.2 part dibutyltin dilaurate; in the manner as described in Example 1. A coating of 18% was obtained.

EXAMPLES 6–15

Films were prepared as described in Example 1 in the following proportions:

| Example No. | Starch | PVA | Glycerol | Formaldehyde | PSM | $NH_4Cl$ |
|---|---|---|---|---|---|---|
| 6 | 8 | 2 | 2.5 | 0.0 | 0.1 | 0.0 |
| 7 | 8 | 2 | 2.0 | 0.2 | 0.1 | 0.3 |
| 8 | 8 | 2 | 2.5 | 0.2 | 0.1 | 0.3 |
| 9 | 8 | 2 | 3.0 | 0.3 | 0.1 | 0.3 |
| 10 | 8 | 2 | 2.5 | 0.0 | 0.1 | 0.0 |
| 11 | 8 | 2 | 2.0 | 0.2 | 0.1 | 0.3 |
| 12 | 8 | 2 | 2.5 | 0.2 | 0.1 | 0.3 |
| 13 | 8 | 2 | 3.0 | 0.3 | 0.1 | 0.3 |
| 14 | 8 | 2 | 3.0 | 0.0 | 0.0 | 0.0 |
| 15 | 8 | 2 | 3.0 | 0.2 | 0.0 | 0.5 |

The films of Examples 6–9 were coated with the following solution: 15 parts PVCA, 175 cc. MEK, and 3 parts TDI-castor oil prepolymer bonding solution described in Example 1 and 0.2 part dibutyltin dilaurate; in the manner described in Example 1. Coatings of from 5 to 10% were obtained.

The films of Examples 10–13 were coated with the following coating solution: 15 parts PVC, 10 parts dioctyl phthalate, 175 cc. MEK, 3 parts TDI-castor oil prepolymer bonding solution described in Example 1, and 0.2 part dibutyltin dilaurate; in the manner described in Example 1. Coatings of from 5 to 10% were obtained.

Properties of the films of Examples 14 and 15, which were not coated, were compared to the properties of the coated films of Examples 6–13, Table 1.

EXAMPLE 16

Examples 1–4 were tested in a Twin Arc Model DMC-HR Weather-Ometer (Atlas Electric Devices Company, Chicago, Illinois) which was operated on a cycle of 120 min. of light only followed by 18 min. of light and water spray using a black panel temperature of 63° C. The cycles were continuously repeated until each film showed significant deterioration, Table 2.

Table 2

| Example No. | Weather-Ometer time, hr. |
|---|---|
| 1 | 60 |
| 2 | 120 |
| 3 | 40 |
| 4 | 80 |

Table 1

| Example No. | Thickness, mils. | Tensile strength[1], p.s.i. 50% RH[4] | Tensile strength[1], p.s.i. 10% RH[4] | Tensile strength[1], p.s.i. Wet[5] | Elongation[1], % 50% RH[4] | Elongation[1], % Wet[5] | MIT fold[2], 50% RH, 500 lb. | Mullen burst[3], p.s.i. |
|---|---|---|---|---|---|---|---|---|
| 1 | ... | 1375 | ... | ... | 201 | ... | ... | 10 |
| 2 | ... | 1401 | ... | ... | 214 | ... | ... | ... |
| 3 | ... | 1684 | ... | ... | 132 | ... | ... | 9 |
| 4 | ... | 1606 | ... | ... | 136 | ... | ... | 9 |
| 6 | 1.6 | 3010 | ... | 390 | 10 | 30 | 51 | 11 |
| 7 | 1.8 | 2520 | ... | 380 | 10 | 120 | 237 | 14 |
| 8 | 1.9 | 2450 | 2510 | 260 | 75 | 100 | ... | 13 |

Table 1-continued

| Example No. | Thickness, mils. | Tensile strength[1], p.s.i. 50% RH[4] | Tensile strength[1], p.s.i. 10% RH[4] | Tensile strength[1], p.s.i. Wet[5] | Elongation[1], % 50% RH[4] | Elongation[1], % Wet[5] | MIT fold[2], 50% RH, 500 lb. | Mullen burst[3], p.s.i. |
|---|---|---|---|---|---|---|---|---|
| 9 | 2.1 | 2690 | 2960 | 210 | 55 | 80 | ... | 15 |
| 10 | 1.9 | 2610 | ... | 180 | 10 | 120 | 39 | 14 |
| 11 | 1.8 | 2460 | ... | 550 | 13 | 210 | 18 | 8 |
| 12 | 1.9 | 2500 | ... | 450 | 81 | 230 | 50 | 15 |
| 13 | 2.0 | 2750 | ... | 490 | 37 | 200 | 52 | 15 |
| 14 | ... | 3060 | ... | ... | 11 | ... | ... | ... |
| 15 | ... | 2250 | ... | ... | 52 | ... | ... | ... |

[1]Scott Tester, Scott Testers, Inc., Providence, Rhode Island.
[2]Folding Endurance Tester, Tinius Olsen Testing Machine Co., Willow Grove, Pennsylvania.
[3]The Mullen Tester, B. F. Perkins and Son, Inc., Holyoke, Massachusetts.
[4]RH = relative humidity.
[5]After 16-hr. H$_2$O soak.

We claim:

1. A self-supporting, degradable, agricultural mulch film comprising from 1 to 4 parts of polyvinyl alcohol having a degree of hydrolysis of from 85 to 100%, 8 parts of starch, and from 1 to 5 parts of glycerol; said film being completely coated with from 5 to 20% of a water-resistant coating composition comprising a mixture of from 0.1 to 0.2 parts of a polyol-toluene-diisocyanate prepolymer containing free isocyanate groups and 1 part of polyvinylidene chloride-acrylonitrile copolymer or 1 part of polyvinyl chloride resin containing a plasticizing amount of a suitable plasticizer, all parts by weight.

2. A film as described in claim 1 wherein the polyvinyl alcohol has a degree of polymerization of from 1000 to 1700 structural units.

3. A film as described in claim 1 wherein the polyvinyl alcohol has a degree of hydrolysis of from 98 to 100%.

4. A film as described in claim 1 wherein polyvinyl alcohol is present in amounts equal to 2 to 3 parts per 8 parts of starch.

5. A film as described in claim 1 wherein glycerol is present in amounts equal to 2 to 4 parts per 8 parts of starch.

6. A film as described in claim 1 which additionally contains about 0.2 part formaldehyde, about 0.4 part NH$_4$Cl, and about 0.1 part of a suitable surfactant per 8 parts of starch.

7. A film as described in claim 1 wherein the polyol-toluene-diisocyanate prepolymer is castor oil-toluene-diisocyanate prepolymer containing from 0.1 to 2 equivalents of excess —NCO groups.

8. A film as described in claim 1 wherein the polyvinyl chloride is plasticized with from 20 to 50% dioctyl phthalate.

9. A film as described in claim 1 wherein the coating composition additionally contains from 0.01 to 0.03 parts dibutyltin dilaurate.

10. A film as described in claim 1 wherein the film is completely coated with from 8 to 18% of said water-resistant coating composition.

11. A film as described in claim 6 wherein the suitable surfactant is polyoxyethylene sorbitan monooleate.

12. A self-supporting, degradable, agricultural mulch film comprising from 2 to 3 parts of polyvinyl alcohol having a degree of hydrolysis of from 98 to 100% and a degree of polymerization of from 1000 to 1700 structural units, 8 parts of starch, from 2 to 4 parts of glycerol, about 0.2 part formaldehyde, about 0.4 part NH$_4$Cl, and about 0.1 part of polyethylene sorbitan monooleate; said film being completely coated with from 8 to 18% by weight of a water-resistant composition comprising a mixture of from 0.1 to 0.2 part of castor oil-toluene-diisocyanate prepolymer containing from 0.1 to 2 equivalents of excess —NCO groups, 0.01 to 0.03 parts dibutyltin dilaurate, and 1 part polyvinylidene chloride-acrylonitrile copolymer or 1 part polyvinyl chloride containing 20 to 50% by weight dioctyl phthalate.

13. A method of preparing a self-supporting, degradable, agricultural mulch film comprising the steps of:
  a. reacting, in an aqueous suspension, from 1 to 4 parts of polyvinyl alcohol having a degree of hydrolysis of from 85 to 100%, 8 parts of starch, and from 1 to 5 parts of glycerol;
  b. casting a film from the reaction mixture resulting from step (a);
  c. drying the film resulting from step (b);
  d. reacting a suitable polyol with toluene-diisocyanate in amounts such that the —NCO groups of said toluene-diisocyanate are from 0.1 to 2 equivalents in excess of the amount of —OH groups of said polyol;
  e. preparing a solution containing a suitable solvent, from 0.1 to 0.2 parts of the reaction mixture resulting from step (d), and 1 part polyvinylidene chloride-acrylonitrile copolymer or 1 part polyvinyl chloride containing a plasticizing amount of a suitable plasticizer;
  f. coating the dried film resulting from step (c) with the solution resulting from step (e) in amounts sufficient to provide, after removal of the solvent, a water-resistant coating which is 5 to 20% of the total weight of said self-supporting, degradable, agricultural mulch film; and
  g. removing the solvent from the product resulting from step (f).

14. A method as described in claim 13 wherein the polyvinyl alcohol described in step (a) has a degree of polymerization of from 1000 to 1700 structural units.

15. A method as described in claim 13 wherein the polyvinyl alcohol described in step (a) has a degree of hydrolysis of 98 to 100%.

16. A method as described in claim 13 wherein the polyvinyl alcohol described in step (a) is present in amounts of from 2 to 3 parts per 8 parts of starch.

17. A method as described in claim 13 wherein the glycerol described in step (a) is present in amounts of from 2 to 4 parts per 8 parts of starch.

18. A method as described in claim 13 wherein the reaction mixture described in step (a) additionally contains about 0.2 part formaldehyde, about 0.4 part NH$_4$Cl, and about 0.1 part of a suitable surfactant per 8 parts of starch.

19. A method as described in claim 13 wherein the polyol described in step (d) is castor oil.

20. A method as described in claim 13 wherein the poly vinyl chloride described in step (e) is plasticized with from 20 to 50% by weight dioctyl phthalate.

21. A method as described in claim 13 wherein the solution described in step (e) additionally contains from 0.01 to 0.03 parts dibutyltin dilaurate.

22. A method as described in claim 13 wherein the amount of solution described in step (f) is sufficient to provide, after removal of the solvent, a water-resistant coating which is 8 to 18% of the total weight of said self-supporting, degradable, agricultural mulch film.

23. A method as described in claim 18 wherein the suitable surfactant is polyoxyethylene sorbitan monooleate.

24. A method of preparing a self-supporting, degradable, agricultural mulch film comprising the steps of:
  a. reacting, in an aqueous suspension, from 2 to 3 parts of polyvinyl alcohol having a degree of hydrolysis of from 98 to 100% and a degree of polymerization of from 1000 to 1700 structural units, 8 parts of starch, 2 to 4 parts of glycerol, about 0.2 part of formaldehyde, and about 0.1 part of polyethylene sorbitan monooleate at 90° to 100° C. for about 2 hr., then adding about 0.4 part of NH$_4$Cl and reacting for an additional 10 min.;
  b. casting a film from the reaction mixture resulting from step (a);
  c. drying the film resulting from step (b);
  d. reacting castor oil with toluene-diisocyanate in amounts such that the —NCO groups of said toluene-diisocyanate are about 0.5 equivalents in excess of the amount of —OH groups of said castor oil;
  e. preparing a solution of methyl ethyl ketone and 0.1 to 0.2 parts of the reaction mixture resulting from step (d), from 0.1 to 0.3 parts dibutyltin dilaurate, and 1 part per polyvinylidene chloride-acrylonitrile copolymer or 1 part polyvinyl chloride containing from 20 to 50% by weight dioctyl phthalate; and
  f. coating the dried film resulting from step (c) with the solution resulting from step (e) in amounts sufficient to provide, after removal of the solvent, a water-resistant coating which is 5 to 20% of the total weight of said self-supporting, degradable, agricultural mulch film; and
  g. removing the solvent from the product resulting from step (f).

* * * * *